A. P. GUSTAFSON.
SOUND REPRODUCING OR TALKING MACHINE.
APPLICATION FILED APR. 29, 1916.

1,287,585.

Patented Dec. 10, 1918.
2 SHEETS—SHEET 1.

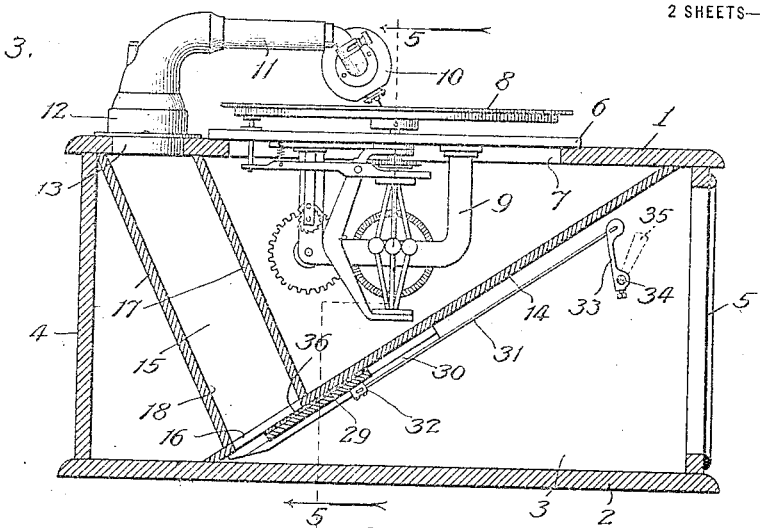
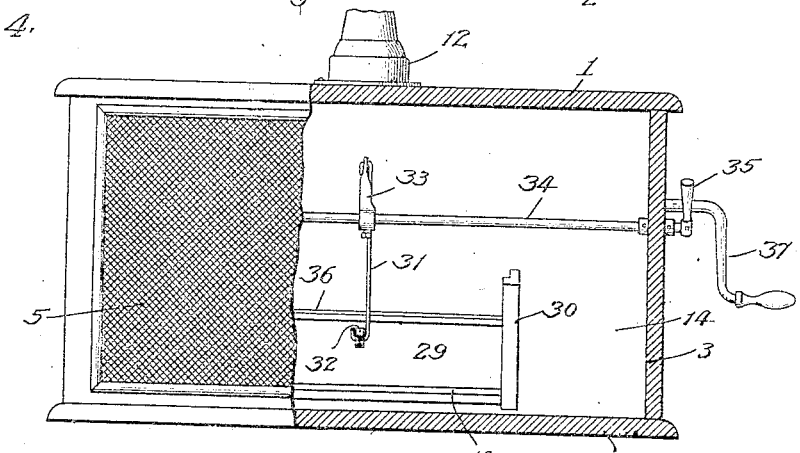
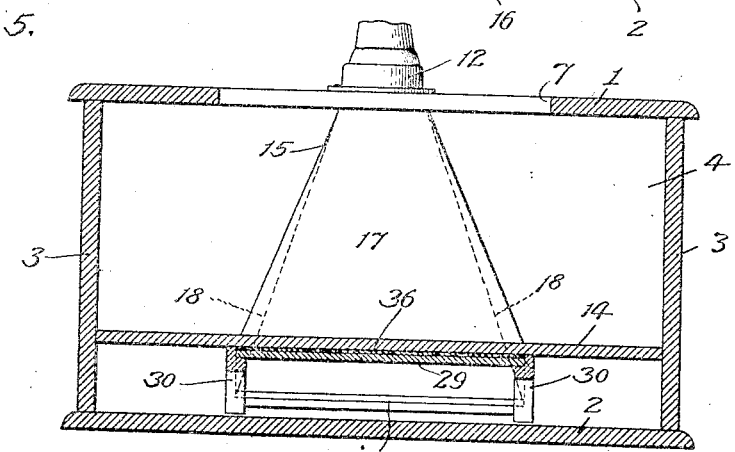

UNITED STATES PATENT OFFICE.

ADOLPH P. GUSTAFSON, OF CHICAGO, ILLINOIS, ASSIGNOR TO M. SCHULZ COMPANY, OF CHICAGO, ILLINOIS, A CORPORATION.

SOUND-REPRODUCING OR TALKING MACHINE.

1,287,585.

Specification of Letters Patent.

Patented Dec. 10, 1918.

Application filed April 29, 1916. Serial No. 94,314.

*To all whom it may concern:*

Be it known that I, ADOLPH P. GUSTAFSON, a citizen of the United States, and a resident of Chicago, county of Cook, and State of Illinois, have invented certain new and useful Improvements in Sound-Reproducing or Talking Machines, of which the following is a full, clear, and exact description.

The invention relates to sound reproducing or talking machines and seeks to provide an improved arrangement of the sound amplifying and modifying devices. The invention consists in the features of improvement hereinafter set forth, illustrated in the preferred form in the accompanying drawings and more particularly pointed out in the appended claims.

Figure 1:
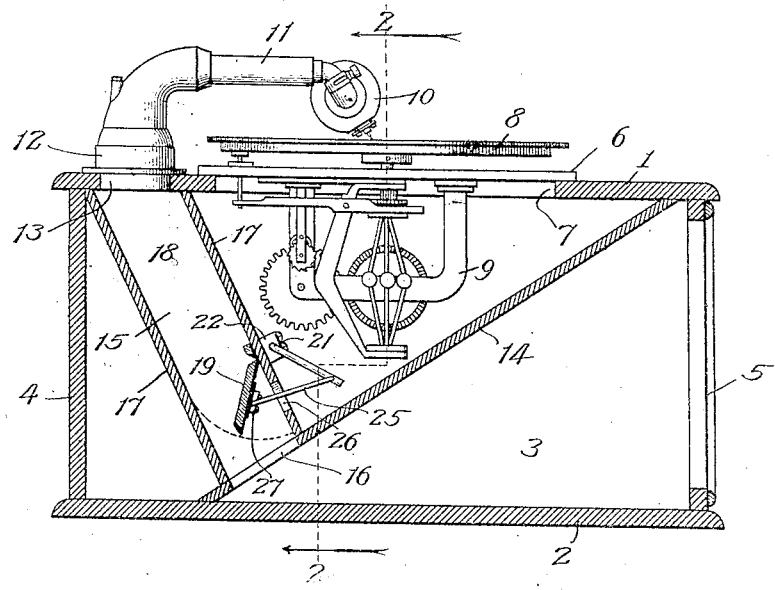
Figure 2:
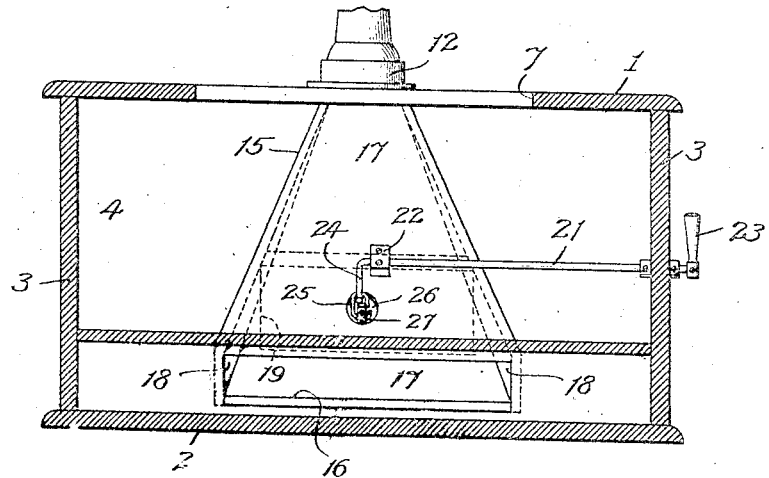

In the drawings Figure 1 is a vertical section from front to rear of the preferred embodiment of the invention. Fig. 2 is a cross section on line 2—2 of Fig. 1 with the turn table, actuating motor and sound box omitted. Fig. 3 is a view similar to Fig. 1, illustrating a modification. Fig. 4 is a front view, with parts broken away, of the form shown in Fig. 3. Fig. 5 is a section on the line 5—5 of Fig. 3 with the turn table, actuating motor and sound box omitted.

In the construction shown, the casing is rectangular in form and comprises top and bottom walls 1 and 2, side walls 3, a rear wall 4 and an open front preferably covered by a lattice or screen 5. A frame or plate 6 is mounted upon the top wall 1 over a large opening 7 therein and carries a rotating turn table or record support 8 above the top wall 1 and a turn table actuating motor 9 below the top wall and within the upper portion of the casing.

The sound box or reproducer 10 is mounted upon a hollow swinging sound box arm 11 and the latter is mounted in any suitable manner upon a support 12 that is fixed to the upper rear portion of the casing over an opening 13 in the top wall 1.

The sound amplifying conduit is arranged within the casing and comprises a rear section extending downwardly from the opening 13 and a second main section extending forwardly toward the open front of the casing. Preferably, as shown, the main portion of the amplifying conduit is formed between the bottom wall 2 and a partition 14 which extends between the side walls 3 of the casing and the rear edge of which is in contact with the rear portion of the bottom wall 2. From this point, the partition extends upwardly and forwardly to a point adjacent the upper edge of the open front of the casing.

The rear conduit section 15 is inclined downwardly and forwardly from the opening 13 to an opening 16 formed in the lower rear portion of the partition 14. The conduit section 15 is flaring and in the preferred form shown, comprises straight, substantially parallel front and rear walls 17 and with flaring side walls 18, so that the flaring conduit section is rectangular in section and gradually increases in cross sectional area toward its lower end. The opening 16 is also preferably rectangular and corresponds in size to the lower end of the conduit section 15. It should be noted that the axes of the inner and outer conduit sections are substantially at right angles to each other and that the rear portion of the bottom wall 2 of the main conduit section extends abruptly across the mouth or opening 16 of the rear or inner conduit sections and at a sharply acute angle to the plane of such opening. With this arrangement, the sound waves passing from the rear conduit section strike abruptly upon the rear portion of the bottom wall 2 of the main conduit section and are thereby reflected upwardly against the inclined upper wall 14 which is disposed at such an angle that it reflects the sound waves forwardly through the open front of the casing. This arrangement of the amplifying conduit acts effectively to increase the volume and resonance of the sound produced.

To vary the intensity of the sound produced a shutter is arranged within the conduit and is preferably disposed within the lower portion of the rear conduit section 15. As shown, the shutter 19 is rectangular in outline and fits within the lower portion of the conduit section 15. A cloth or leather hinge 20 connects the upper forward edge of the shutter to the front wall of the conduit and the shutter is arranged to swing to and from the back wall thereof to modify the sound produced. A horizontal rock shaft 21 is journaled at its outer end in one of the side walls 3 of the casing and, at its inner end in a bearing 22 fixed to the outer face of the front wall of the conduit section 15. At its outer end the shaft 21 is provided with an operating handle 23 and at its inner end with a depending crank arm 24. A link 25 connected to the crank arm extends through an opening 26 in the front wall of the conduit section 15 and is connected to a clip 27 on the shutter 19. By means of the handle 23 the shutter can be adjusted to modify the intensity of the sound produced. In its extreme closed position, the free edge of the shutter abuts against the rear wall of the conduit section 15, and, in its open position, the shutter closes the opening 26 in the front wall of the conduit section.

In the form shown in Figs. 3, 4 and 5, the shutter for controlling the sound is in the form of a slide 29. This slide is rectangular in outline, is slightly larger than the opening 16 in the partition 14 and is mounted on the under side of the partition adjacent such opening. The edges of the slide 29, as shown, engage rabbeted guides 30 that are fixed to the under side of the partition 14 at the lower rear portion. An actuating link 31 is connected to a clip 32 fixed to the slide 29 and extends upwardly and forwardly therefrom to the upper end of a rock arm 33. The latter is mounted at its lower end upon a horizontal rock shaft 34 that is journaled in the side walls 3 of the casing. The one end of the rock shaft projects and is provided with an operating handle 35 so that the slide can be adjusted, as desired, to extend more or less over the lower end of the conduit section 15 and thereby modify the intensity of the sound produced as desired. The upper face of the slide 19 adjacent the partition 14 is preferably covered with a strip 36 of felt or the like which engages the face of the partition 14 with sufficient friction to hold the slide in adjusted position.

The motor which is arranged in the casing above the partition 14 and in front of the conduit section 15 may be of any suitable construction. Preferably, a spring motor is used and is adapted to be wound up by the projecting crank 37. The sound box and sound box arm may be of any suitable construction. The casing, if desired, may form the upper portion of a cabinet, the lower portion of which is used for storing records, and an upper lid may be provided to inclose the turn table and reproducer.

Obviously, other changes may be made without departure from the essentials of the invention as defined in the claims.

I claim as my invention:—

1. In a talking machine, the combination with a casing, of a sound amplifying conduit within said casing comprising a downwardly and forwardly inclined, inner section and an outer section opening at the front of the casing and having an upwardly and forwardly inclined axis substantially at right angles to the axis of said inner section and said outer section having a bottom wall, the rear portion of which extends across the mouth or opening at the lower end of said inner section at a sharply acute angle to the plane thereof and forms a reflecting surface for directing the sound waves from said inner section against the upper wall of said outer section, substantially as described.

2. In a talking machine, the combination with a casing, of a sound amplifying conduit within said casing comprising a downwardly and forwardly inclined, inner section and an outer section opening at the front of the casing and having an upwardly and forwardly inclined axis substantially at right angles to the axis of said inner section and said outer section having a bottom wall, the rear portion of which extends across the mouth or opening at the lower end of said inner section at a sharply acute angle to the plane thereof and forming a reflecting surface for directing the sound waves from said inner section against the upper wall of said outer section and a sound modulating shutter movable across said conduit adjacent the juncture of said conduit sections, for varying the area of the sound waves projected onto said reflecting surface, substantially as described.

3. In a talking machine, the combination with a casing, of a sound amplifying conduit within said casing comprising a downwardly and forwardly, inclined inner section and an outer section substantially rectangular in cross section and opening at the front of the casing, said outer section having an upper wall upwardly and forwardly inclined from the lower end or mouth of said inner section and a substantially horizontal lower wall, the rear portion of which extends across the mouth or opening at the lower end of said inner section at a sharply acute angle to the plane of said opening and forming a reflecting surface for directing the sound waves upwardly against said inclined upper wall, substantially as described.

4. In a talking machine, the combination of a casing opening at its front, a partition in said casing inclined upwardly and forwardly from the rear portion of the lower horizontal wall of said casing and forming therewith a main amplifying conduit substantially rectangular in cross section and having an upwardly and forwardly inclined axis, said partition having an opening at its lower rear portion, a flaring inner conduit section inclined downwardly and forwardly from the upper rear portion of said casing at substantially right angles to the axis of said main conduit and communicating with said opening, whereby the sound waves projected from said inner conduit section are reflected by the rear portion of said lower horizontal wall upwardly against said inclined partition, substantially as described.

5. In a talking machine, the combination of a casing opening at its front, a partition in said casing inclined upwardly and forwardly from the rear portion of the lower horizontal wall of said casing and forming therewith a main amplifying conduit substantially rectangular in cross section and having an upwardly and forwardly inclined axis, said partition having an opening at its lower rear portion, a flaring conduit section inclined downwardly and forwardly from the upper rear portion of said casing at substantially right angles to the axis of said main conduit and communicating with said opening, whereby the sound waves projected from said inner conduit section are reflected by the rear portion of said lower horizontal wall upwardly against said inclined partition, and an adjustable sound modulating shutter movable across the lower end of said inner conduit section for varying the cross sectional area of the sound waves projected from said inner conduit section upon said lower horizontal wall, substantially as described.

6. In a talking machine, the combination of a casing having an opening at its front, a partition in said casing inclined upwardly and forwardly from the rear portion of the lower wall of said casing and forming therewith a main amplifying conduit substantially rectangular in cross section, said partition having a rectangular opening at its lower rear portion, a flaring conduit section inclined downwardly and forwardly from the upper rear portion of said casing and communicating with said opening, said conduit section being rectangular in section and comprising substantially parallel front and rear walls and flaring side walls, and a reproducer communicating with the upper end of said conduit section, substantially as described.

7. In a talking machine, the combination of a casing having an opening at its front, a partition in said casing inclined upwardly and forwardly from the rear portion of the lower wall of said casing and forming therewith a main amplifying conduit substantially rectangular in cross section, said partition having a rectangular opening at its lower rear portion, a flaring conduit section inclined downwardly and forwardly from the upper rear portion of said casing and communicating with said opening, said conduit section being rectangular in section and comprising substantially parallel front and rear walls and flaring side walls, a rectangular, adjustable shutter at the lower end of said conduit section, and a reproducer communicating with the upper end thereof, substantially as described.

ADOLPH P. GUSTAFSON.